United States Patent
Yamaguchi et al.

(10) Patent No.: US 7,981,339 B2
(45) Date of Patent: Jul. 19, 2011

(54) METHOD OF PRODUCING NON-MUTUALLY-ADHESIVE POLYMER PELLET, AND APPARATUS THEREFOR

(75) Inventors: Takayuki Yamaguchi, Yamatokooriyama (JP); Hiroyuki Tanimura, Sodegaura (JP); Takuro Nasu, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1076 days.

(21) Appl. No.: 11/012,710

(22) Filed: Dec. 15, 2004

(65) Prior Publication Data
US 2005/0146075 A1    Jul. 7, 2005

(30) Foreign Application Priority Data
Dec. 18, 2003   (JP) .................. 2003-420595

(51) Int. Cl.
*B29C 47/88* (2006.01)
*B29C 47/00* (2006.01)
*B26D 7/14* (2006.01)
*B26D 3/00* (2006.01)
*A01J 21/02* (2006.01)
*B32B 5/16* (2006.01)

(52) U.S. Cl. .......... 264/211.12; 264/148; 83/17; 83/39; 83/49; 425/311; 428/407

(58) Field of Classification Search ............ 264/148, 264/211.12; 83/17, 39, 49; 428/407; 425/311
See application file for complete search history.

(56) References Cited

U.S. PATENT DOCUMENTS
| | | | | |
|---|---|---|---|---|
| 4,978,288 A | * | 12/1990 | Ellwood | 425/311 |
| 5,397,836 A | * | 3/1995 | DeNicola et al. | 525/71 |
| 5,681,913 A | * | 10/1997 | Sustic et al. | 526/348.6 |

FOREIGN PATENT DOCUMENTS
| | | | |
|---|---|---|---|
| JP | 7-171828 A | | 7/1995 |
| JP | 8-120111 A | | 5/1996 |
| JP | 9-24902 A | | 1/1997 |
| JP | 9-155860 A | | 6/1997 |
| JP | 2000-52336 A | | 2/2000 |
| JP | 2000052336 A | * | 2/2000 |
| JP | 2002-332360 A | | 11/2002 |
| JP | 2002-338933 A | | 11/2002 |

OTHER PUBLICATIONS
Yanase et al., Machine Translation of JP 2000-052336 A, Feb. 2000.*

* cited by examiner

*Primary Examiner* — Monica A Huson
*Assistant Examiner* — Michael T Piery
(74) *Attorney, Agent, or Firm* — Panitch Schwarze Belisario & Nadel LLP

(57) ABSTRACT

A method and apparatus are provided for continuously producing a polymer pellet efficiently in which, in storing, transporting or feeding to a processing apparatus, the obtained pellets containing the adhesive polymer do not easily mutually adhere, and handling thereof is excellent. The method comprises a step of deforming at temperatures of about 30 to 150° C. under pressure an adhesive polymer coated with a thermoplastic polymer, and a step of cutting the deformed portion of the coated polymer.

10 Claims, 2 Drawing Sheets

METHOD OF PRODUCING NON-MUTUALLY-ADHESIVE POLYMER PELLET, AND APPARATUS THEREFOR

BACKGROUND OF THE INVENTION

The present invention relates to a method for producing a polymer pellet in which in storing, transporting or feeding to a processing apparatus, the obtained pellets containing adhesive polymer do not easily mutually adhere, and handling thereof is excellent. The invention also relates to an apparatus used for this method.

It is known that an adhesive polymer is coated with a non-adhesive polymer, and then the coated polymer is cut to produce polymer pellets which are less adhesive.

For example, a polymer pellet having a core-sheath structure is known, which is obtained by cutting a strand of core-sheath structure in which a thermoplastic elastomer or amorphous polyolefin as a core is covered with a crystalline polyolefin as a sheath (Japanese published patent application (kokai) No. JP 7-171828 A).

There is also known a method of laminating a thermoplastic polymer film on both surfaces of a sheet of adhesive rubber, and cutting this to give a pallet (Japanese published patent application No. JP 2000-52336 A).

However, in pellets obtained by cutting with a strand cutter or pelletizer, disclosed in these technologies, an adhesive polymer, such as thermoplastic elastomer, amorphous polyolefin or rubber, is exposed on its cut surface, and the obtained pellets are not completely adhesive with each other. JP 2000-52336 A discloses a method of cutting with a cutter knife. However, productivity thereof is low, and therefore, this method is not preferable.

BRIEF SUMMARY OF THE INVENTION

An object of the present invention is to provide a method of continuously producing a polymer pellet efficiently in which, in storing, transporting or feeding to a processing apparatus, the obtained pellets containing the adhesive polymer do not easily mutually adhere, and handling thereof is excellent. Another object of the invention is to provide an apparatus used for this method.

The present inventors have intensively studied and resultantly found that a polymer pellet showing less mutual adhesion is obtained with good productivity by deforming a coated polymer obtained by coating an adhesive polymer with a thermoplastic polymer, at temperatures of about 30 to 150° C. under pressure, and then cutting the deformed polymer, leading to completion of the present invention.

Namely, the present invention is a method for producing a polymer pellet comprising a step of deforming, at temperatures of about 30 to 150° C. under pressure, a coated polymer in which an adhesive polymer is coated with a thermoplastic polymer and a step of cutting the deformed portion of the coated polymer.

Also, the present invention provides an apparatus for producing a polymer pellet, the apparatus comprising means for conveying a coated polymer, means for supporting the coated polymer, a supporting plate having means for deforming and cutting the coated polymer, means for reciprocating the supporting plate upwardly and downwardly, wherein the means for reciprocating holds the supporting plate so that the means for deforming and cutting faces the coated polymer, and means for collecting cut pellets.

Further, the present invention provides the above-mentioned apparatus, wherein the means for conveying a coated polymer is a delivery roll, the means for supporting the coated polymer is an anvil roll, the means for deforming and cutting comprises a pressing roll and a cutting roll in which the pressing roll presses the coated polymer on the anvil roll and has an pressing blade on its surface and in which the cutting roll is placed at a position following the pressing roll contact with the coated polymer on the anvil roll and has a cutting blade on its surface for cutting the deformed coated polymer, and the means for collecting the cut pellets is a pellet catcher.

Still further, the present invention provides a polymer pellet obtained by the above-mentioned production method, and a molded article obtained by molding the polymer pellet.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
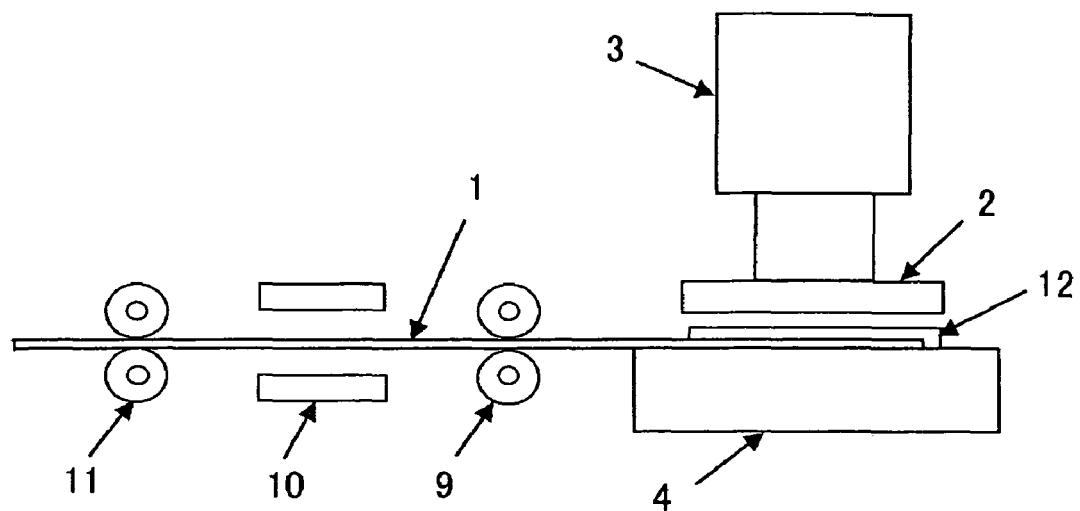
FIG. 1 is a schematic side view of one embodiment of an apparatus for producing a polymer pellet of the present invention.

The adhesive polymer in the present invention means a polymer having a nature in which, when it is formed into pallets and left at normal temperature (23° C.), pellets mutually adhere to give a block of coagulated pellets. Particularly when such mutual adhesion is significant, pellets closely and completely adhere with each other to give one block, no longer leaving the shape of pellet.

A polymer pellet obtained by the present invention shows little mutually adhesive property (hereinafter sometimes called as "non-mutually-adhesive").

The example of an adhesive polymer is not restricted and includes, for example, amorphous olefin polymers, rubbers, styrene block copolymers and the like.

The above-mentioned amorphous olefin polymer is defined in the present invention as a polymer containing an olefin monomer unit for which a crystal fusion peak, having a fusion calorie of 1 J/g or more, is not observed between −100° C. to 200° C. by differential scanning calorimetry.

Examples of such an amorphous olefin polymer include propylene polymers, such as a propylene homopolymer or a propylene-ethylene copolymer, propylene-1-butene copolymer, propylene-ethylene-1-butene copolymer, propylene-1-hexene copolymer, propylene-1-octene copolymer and the like; ethylene polymers, such as a copolymer composed of an ethylene unit and an (α-olefin unit having 3 or more carbon atoms or a copolymer composed of an ethylene, α-olefin and/or a (non)conjugated diene unit, such as an ethylene-propylene-non-conjugated diene copolymer, ethylene-1-butene copolymer, ethylene-1-hexene copolymer, ethylene-butadiene copolymer and the like. These amorphous olefin polymers may be polymers modified with acrylic acid, methacrylic acid, α,β-unsaturated carboxylic acid, alicyclic carboxylic acid, maleic anhydride or derivatives thereof.

As the method of producing such an amorphous olefin polymer, there are used known polymerization methods using known olefin polymerization catalysts. Examples are slurry polymerization methods, solution polymerization methods, bulk polymerization methods, gas-phase polymerization methods, and the like, using a complex catalyst, such as a metallocene complex, non-metallocene complex, and the like. As the complex catalyst, for example, there are exemplified metallocene-based catalysts described in Japanese published patent applications JP-A 58-19309, 60-35005, 60-35006, 60-35007, 60-35008, 61-130314, 3-163088, 4-268307, 9-12790, 9-87313, 10-508055, 11-80233, 10-508055, and the like; and non-metallocene complex catalysts described in Japanese published patent applications JP-A 10-316710, 11-100394, 11-80228, 11-80227, 10-513489, 10-338706, 11-71420, and the like. Among these, metallocene catalysts are preferable from the standpoint of easy availability. Preferred examples of suitable metallocene catalysts include transition metal complexes of groups III to XII of the Periodic Table having at least one anionic cyclopentadiene skeleton and having a $C_1$ symmetric structure. A particularly preferred example of the production method using a metallocene catalyst is a method described in European published patent application EP 1211287 A.

Examples of the above-mentioned rubbers include natural rubber, styrene rubbers, such as styrene butadiene rubber, liquid polymerized styrene-butadiene rubber and the like, as well as polyisobutylene rubbers, butyl rubbers, butadiene rubbers, isoprene rubbers, alfi-rubbers, nitrile rubbers, fluorine rubbers, vinylpyridine rubbers, silicone rubbers, butadiene-methyl methacrylate rubbers, acrylic rubbers, urethane rubbers, and the like.

Examples of styrene rubbers include styrene-isoprene-styrene block copolymer (SIS), styrene-butylene-styrene block copolymer (SBS), hydrogenated SBS copolymer, styrene-ethylene-butylene-styrene block copolymer (SEBS), styrene-ethylene-propylene-styrene block copolymer (SEPS), and the like.

These adhesive polymers may be used in the form of a mixture in some cases. If necessary, antioxidants, crystal nucleus agents, ultraviolet absorbers, anti-static agents, lubricants, inorganic fillers, such as calcium carbonate, talk, mica and the like; anti-fogging agents, petroleum resins, mineral oils, glass fibers, natural fibers, carbon fibers, flame retardants, and the like, may also be contained.

A thermoplastic polymer used for coating an adhesive polymer in the present invention, includes, for example, crystalline olefin polymers, such as crystalline propylene polymers, crystalline ethylene polymers, and the like, and polystyrene polymers, nylon polymers, polyester polymers, polymethyl methacrylate, polyvinyl alcohol, polycarbonate, polyvinyl chloride, polyvinylidene chloride and the like These can be appropriately selected depending on the kind of rubber to be pelletized. Among these, crystalline olefin polymers are preferable from the standpoints of cost of raw materials, ease of processing, easy handling, and the like.

The above-mentioned crystalline olefin polymer is defined in the present invention as a polymer having a crystal fusion peak observed at temperatures of 100° C. or more in differential scanning calorimetry. From the standpoint of obtaining a non-mutually-adhesive pellet, the temperature at which crystal fusion peak is observed is preferably 120° C. or more, particularly preferably 130° C. or more.

Examples of such a crystalline olefin polymer include a propylene homopolymer, propylene-ethylene copolymer, propylene-butene-1 copolymer, propylene-ethylene-butene-1 copolymer, low density polyethylene, middle density polyethylene, high density polyethylene, as well as ethylene-α-olefin copolymers, such as an ethylene-propylene copolymer, ethylene-butene-1 copolymer, ethylene-4-methylpentene-1 copolymer, ethylene-hexene-1 copolymer, ethylene-octene-1 copolymer, ethylene-decene-1 copolymer, and the like. Of these, propylene homopolymers, propylene-ethylene copolymers, propylene-butene-1 copolymers, and propylene-ethylene-butane-1 copolymers are preferably used. These crystalline olefin polymers may be polymers modified with acrylic acid, methacrylic acid, α,β-unsaturated carboxylic acid, alicyclic carboxylic acid, maleic anhydride or derivatives thereof.

As the method of producing such a crystalline olefin polymer, there are used known polymerization methods using known olefin polymerization catalysts. Examples thereof include slurry polymerization methods, solution polymerization methods, bulk polymerization methods, gas-phase polymerization methods, and the like, using a Ziegler-Natta catalyst, a complex catalyst such as a metallocene complex, a non-metallocene complex, or the like, and bulk polymerization methods, solution polymerization methods, and the like using a radical initiator. It is also possible to use commercially available products.

If necessary, antioxidants, ultraviolet absorbers, anti-static agents, pigments, crystal nucleus agents, anti-fogging agents, flame retardants and the like, may also be contained in a thermoplastic polymer in the present invention.

If a film of the above-mentioned thermoplastic polymer is used for coating an adhesive polymer sheet as mentioned below, known methods such as a T die method, inflation method and the like, can be applied. The thickness of a film is generally about 1 to 500 μm, preferably about 5 to 300 μm, particularly preferably about 10 to 100 μm.

The above-mentioned film may be a drawn film. The drawn film can be obtained by known methods, such as a method of drawing by tenter, a tubular drawing method and the like, and may be any of a mono-axially drawn film or bi-axially drawn film. The bi-axially drawn film may be made by sequential bi-axial drawing or simultaneous bi-axial drawing.

Further, the above-mentioned film may be a multi-layer film. The multi-layer film can be obtained by a known co-extrusion method or lamination method.

Examples of coated polymer include a sheet-shaped polymer obtained by coating the upper surface and lower surface of an adhesive polymer sheet with a thermoplastic polymer sheet and a polymer having a core-sheath structure composed of an adhesive polymer as a core and a thermoplastic polymer as a sheath.

As the method of making the above-mentioned adhesive polymer into a sheet, a method is exemplified in which, when an adhesive polymer is a block in the form of bale, the polymer is once ground into about 0.2 to 1 cm squares by a freeze grinder or a wet grinder for grinding in water. Then, the squares are charged into a hopper charging port of an extruder, and extruded into a sheet by a T die extruder. As another method, a method is also mentioned in which an adhesive polymer is previously rendered into melted condition by a kneader. Then, the polymer is charged into a cylinder of a T die extruder and processed into a sheet.

A sheet-shaped coated polymer is obtained, for example, by continuously molding an adhesive polymer into a sheet, using at least two heating rolls, feeding a film made of a thermoplastic polymer on the both surfaces of the sheet-shaped adhesive polymer, and pasting the film to the surfaces.

The size of the above-mentioned heating roll is not particularly restricted, and the roll plane length and roll diameter can be arbitrarily selected. The surface of the heating roll may be subjected to mirror finishing or rough surface finishing. The distance between the surfaces of adjacent heating rolls can be appropriately controlled depending on the thickness of a sheet to be molded.

The heating temperature of the heating roll is preferably about 30° C. to 150° C., more preferably about 40° C. to 120° C. When the molding amount per unit time is large, heating may be deficient in some cases, and in this case, methods in which the diameter of a heating roll is increased or the number of heating rolls increased to three or more, methods in which a mutually-adhesive polymer is pre-heated at a feeding stage, and the like, may be adopted.

The thickness of the above-mentioned sheet-shaped coated polymer is, in terms of the total thickness including a film, preferably about 0.5 mm to 10 mm, more preferably about 0.8 mm to 5 mm. Usually, the form of a plane covered by films is square.

The coated polymer having a core-sheath structure is obtained by feeding a thermoplastic polymer constituting a sheath and an adhesive polymer constituting a core into a melt extruder, and extruding a strand via a core-sheath type complex extrusion die.

The cross-sectional form of a strand is not particularly restricted and may be a circle, ellipse, polygon, or the like.

The thickness of a sheath composed of a thermoplastic polymer is about 200 μm or less, preferably about 100 μm or less, and the size of the cross-section of a strand is about 2 to 10 mmf, preferably about 3 to 8 mmf, in terms of circle.

The method of cutting the above-mentioned coated polymer to produce a pellet will be illustrated below, and either of a sheet-shaped coated polymer or a coated polymer having a core-sheath structure can also be produced in the same manner.

The coated polymer is deformed at temperatures of about 30 to 150° C. under pressure, and cut at the deformed portion to produced pellets.

The temperature of the coated polymer is controlled at about 30 to 150° C., for example, by holding the temperature in production of the coated polymer, heating through a heating roller, heating by heaters placed at upper and lower positions, and/or heating the cutting portion.

The method of conducting deformation under pressure and cutting of a coated polymer with means for deforming and cutting, such as one blade, will be illustrated.

First, a cutting portion is gradually pressed by a cutting blade, and the cutting edge of the cutting blade is forced into a coated polymer. A portion of a thermoplastic polymer at the surface is thereby stretched, an adhesive polymer at the cutting portion is extruded to the peripheral, and upper and lower thermoplastic polymer films get closer. Then, the coated polymer is finally cut by further pressing. It is preferred that the polymer be deformed to a thickness of about 10 to 30% of the thickness before deformation.

The cross-section of the resulting pellet is almost coated with a thermoplastic polymer film, and exposure of an adhesive polymer is slight.

When high pressure is applied on a coated polymer to cut the polymer in short time, the coated polymer may be cut before sufficient deformation, and coating of a cut section with a thermoplastic polymer film may become insufficient. Further, pressure applied first is too weak, and when a coated film is cut under a condition of insufficient deformation, coating of the cut section may be likewise insufficient. Therefore, certain extent of pressure is applied to allow upper and lower thermoplastic polymer films to get closer before cutting.

Pressure to be applied on a coated polymer may be continuously increased gradually to cause sufficient deformation before cutting, or pressure for deformation may be first applied before application of pressure for cutting, in two stages. Pressures and speeds applied in respective cases vary depending on the kind of coated polymer, and are determined by previous tests.

FIG. 1 shows a schematic view of an apparatus for performing these methods.

A coated polymer is conveyed by means for conveying, such as a conveyor belt or a delivery roll 9 and a supporting roll 11, onto means for supporting such as a platform or a rack 4 for effecting deformation and cutting. The coated polymer is deformed and heated so that the temperature in cutting is about 40° C. to 150° C. by means for heating, such as heater (s) 10, placed at upper and lower positions or at one position. The means for conveying, such as delivery roll 9 and/or supporting roll 11, may be means for heating, such as a heating roll having a heating function, instead of the heater 10.

When the coated polymer is deformed and conveyed to a cutting position, a supporting plate 2 having means for reciprocating the supporting plate 2, such as a pulley or a rotary machine, a cutting blade on the coated polymer side is pushed down by a press 3, and pressure is gradually applied continuously on the coated polymer to cause sufficient deformation before cutting, alternatively, pressure is applied in two stages to cause deformation and cutting. When the press is used for the means for reciprocating plate, an air press, hydraulic press or the like is used. After cutting, the supporting plate 2 is lifted, and the molded pellets are swept and collected from the rack by means for collecting cut pellets, such as a sweeping jig 12.

In FIG. 1, the sweeping jig 12 is placed at the rear position of the coated polymer and is pushed toward the front to sweep pellets toward the front side of the apparatus, where the pellets are collected. By making a sequence with controlled timing of movements of the delivery roll 9, press 3 and sweeping jig, pellets can be produced continuously.

Deformation under pressure and cutting of a coated polymer can also be conducted separately by different means for deforming and cutting, such as at least two blades. Namely, deformation is conducted with a pressing blade before cutting with a cutting blade. The ratio of deformation is the same as in the above-mentioned description.

As the pressing blade, blades having a cutting edge are used, which is more round as compared with the cutting blade. Those having a cutting edge width of about 0.2 to 0.3 mm are used. The width of the cutting edge of a cutting blade is about 0.05 mm.

Figure 2:
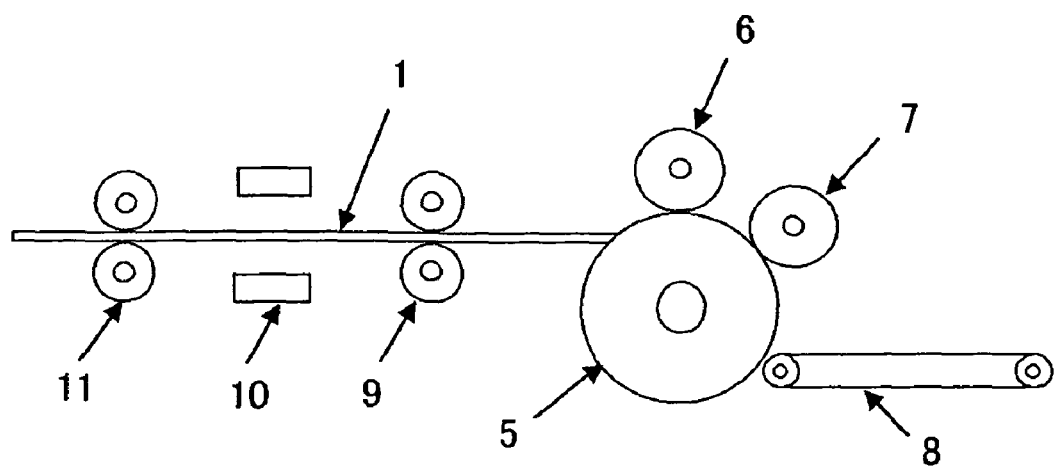
FIG. 2 is a schematic side view of another embodiment of an apparatus for producing a polymer pellet of the present invention.

A schematic view of the apparatus for performing deformation under pressing and cutting of a coated polymer with separate blades will be shown in FIG. 2.

A coated polymer 1 is heated in the same manner as in FIG. 1 and conveyed by a delivery roll 9 and supporting roll 11 onto an anvil roll 5 as means for supporting the coated polymer. On the anvil roll 5 supporting a coated polymer, a pressing roll 6 is placed in contact with the coated polymer 1 via the anvil roll 5. On the surface of the pressing roll 6, a pressing blade is mounted, and the coated polymer is pressed by this to deform. A cutting roll 7 is placed at the position following the pressing roll 6 along the progressing direction of the coated polymer. On the surface of the cutting roll 7, a cutting blade is mounted, and the deformed cutting portion is cut by this. Molded pellets fall on and are collected by a pallet catcher 8.

The coated polymer having a core-sheath structure can also be processed in the same manner as for a sheet-shaped coated polymer to produce pellets. In this case, a delivery roll with a groove is used as means for conveying. Many strands are simultaneously conveyed, deformed and cut, and thus, pellets can be produced with good productivity.

The pellets obtained by the above-mentioned method often have a structure in which the surface thereof is coated with curved surfaces, and an index for the ratio of polymers adhered with each other (mutual adhesion property) can be obtained by measuring the exposure proportion of adhesive polymer on the surface formed by cutting (adhesive polymer exposure index) as mentioned later. For obtaining good mutual adhesion property, the adhesive polymer exposure index is preferably about 50% or less, further preferably about 30% or less, particularly preferably about 20% or less of that before deformation and cutting of pellets.

On the surface formed by cutting, an adhesive polymer is often exposed in the approximate form of a band along the vertical direction to the thickness direction of a pellet. In the present invention, the surface formed by cutting is observed from the pellet side surface (direction vertical to the thickness direction of pellet). The average thickness (mm) of portions of an adhesive polymer exposed in the approximate form of band is calculated, and the exposure proportion (adhesive polymer exposure index) is calculated according to the following formula.

Adhesive polymer exposure index (%)=[(average thickness (mm) of exposed portions of adhesive polymer on the surface formed by cutting)/(total pellet average thickness (mm))]×100

The size of a pellet is not particularly restricted. The length of one edge of a plane coated with films is preferably about 2 mm to 10 mm, from the viewpoint of quantitatively feeding to a processing apparatus later.

For complete non-adhesive property, the surface of the resulting non-mutually-adhesive polymer pellet may be dusted with an inorganic fine powder or organic fine powder. When dusted with an inorganic fine powder or organic fine powder, there is an effect that the inorganic fine powder or organic fine powder adheres to a part of the pellet not coated with a thermoplastic polymer, to complete non-mutual adhesion.

Examples of an inorganic fine powder or organic fine powder include, for example, calcium carbonate, barium sulfate, silica, talc, calcium stearate, and polyolefin powders. These can be used singly or in combination of two or more. Of these, calcium stearate and polyolefin powders are particularly suitable. As the polyolefin powder, those having an average particle size of about 500 μm or less are preferable. Examples of the polyolefin powder are powders of ethylene polymers and propylene polymers, and for example, a low density polyethylene fine particle (Flocene UF-40 manufactured by Sumitomo Seika Chemicals Co., Ltd., average particle size: 15 to 22 μm), and the like are preferable.

The non-mutually-adhesive polymer pellet of the present invention can be, because of easy handling, applied to wide uses and fields, such as stationery, dairy general goods, medical tools, food vessels, fibers, and the like, as molded articles of wrapping films, automobile parts, domestic electric parts, document cases, desk mats, table mats, and the like, by known molding methods, for example, known heat molding methods, such as extrusion molding, injection molding, inflation molding, blow molding, press molding, calendar molding, and the like.

The non-mutually-adhesive polymer pellet of the present invention can be suitably used also as an adhesive agent for an adhesive film as one molded body. As the method of producing an adhesive film are mentioned: a method in which a film base material pellet and an adhesive agent pellet are separately extruded under heat, to produce a laminated film including lamination of a base material film and an adhesive agent; a method in which an adhesive agent is previously dissolved in an organic solvent, and the solution is separately applied on a base material film; and other methods.

The adhesive film includes a one-surface adhesive film having an adhesive layer on one surface of a base material, and a two-surface adhesive film having an adhesive layer on both surfaces of a base material. On the side of an adhesive layer, a film or paper for releasing may be placed. In the case of a one-surface adhesive film using no film or paper for releasing, it is preferable that a releasing agent be coated or a material showing good releasability be used on the layer opposed to the adhesive layer. As a material showing good releasability, high density polyethylene, polyamide and the like are listed.

Regarding the base material film, adhesive layer and releasing layer, it is possible to process these layers before pasting by heating and/or press fitting. However, it is preferable to process a plurality of layers simultaneously by means such as lamination and the like, since then processes can be saved. For example, by extruding a base material and an adhesive layer on releasing paper by co-extrusion, a one-surface adhesive tape can be produced at one time.

As the fields in which thus obtained adhesive film can be suitably used, examples are the electronics field, including back grind tape for semiconductor wafers, polishing cloth fixing tape, dicing tape, protective tape for conveying electronic parts, protective tape for printed circuit boards; the automobile field, including window glass protecting film, marking film for indication, marking film for decoration, and sponge tape for buffering, protection, heat insulation and sound insulation; the medical and hygiene material field, including adhesive plaster and percutaneous absorption pasting agent; and the housing and construction material field, including adhesive films and protective films for electric insulation, identification, duct work, window glass protection, curing, wrapping, packing, office, domestic, fixing, binding and repair.

According to the present invention, a polymer pellet can be produced with high productivity, in which in storing, transporting or feeding to a processing apparatus, the obtained pellets containing the adhesive polymer show less mutual adhesion, and handling thereof is excellent.

According to the present invention, a polymer pellet can be produced with high productivity, in which in storing, transporting or feeding to a processing apparatus, the obtained pellets containing the adhesive polymer show less mutual adhesion, and handling thereof is excellent.

EXAMPLES

The present invention will be illustrated further in detail below by examples and comparative example.

Physical properties in the present invention were measured according to the following methods.

(1) Melt Flow Rate (MFR)

This is measured under conditions of a load of 21.18 N and a temperature of 230° C. according to JIS K 7210.

(2) DSC Measurement Method

This was measured under the following conditions using a differential scanning calorimeter (DSC220C manufactured by Seiko Denshi: input compensated DSC):

(i) About 5 mg of a sample was heated up to 200° C. at a temperature raising rate of 30° C./min, and after completion of temperature raising, the temperature was maintained for 5 minutes.

(ii) Then, the sample was cooled down to −100° C. from 200° C. at a temperature lowering rate of 10° C./min, and after completion of temperature lowering, the temperature was maintained for 5 minutes.

(iii) Then, the sample was heated up to 200° C. from −100° C. at a temperature raising rate of 10° C./min. The peak in this (iii) is a crystal fusion peak, and presence or absence of a fusion peak having a peak area of 1 J/g or more was confirmed.

(3) Adhesive Polymer Exposure Index (%)

The surface formed by cutting was observed using an optical microscope from the pellet side (direction vertical to pellet thickness direction), and the average thickness (mm) of exposed portions of an adhesive polymer was calculated, and the index was calculated by the following formulation:

Adhesive polymer exposure index (%)=[(average thickness (mm) of exposed portions of adhesive polymer on the surface formed by cutting)/(total pellet average thickness (mm))]×100

(4) Mutual Adhesion Property of Pellet

Pellets filled in paper bags at a 20 kg unit, and about 5 bags were piled as in practical use embodiment, pressure loaded on the lowest stage was calculated, and the following evaluation was conducted.

150 g of pellets were filled in a beaker having a cross-sectional area of 60 cm$^2$, a load of 1.6 kg was applied on this and maintained at 23° C. for 16 hours, then the pellets were removed, and the mutual adhesion condition of the pellets was observed. The mutual adhesion condition of the pellets is represented by the following standard:

A: no mutual adhesion recognized
B: slight mutual adhesion is recognized, however, easily separable
C: mutual adhesion to give a block

Example 1

(1) Production of Coating Film

A crystalline propylene polymer pellet (manufactured by Sumitomo Chemical Co., Ltd., grade name: FLX82K9, crystal fusion peak temperature by DSC=147° C., MFR=7 g/10 min) was fed as a coating polymer to an extruder of a T die film molding machine manufactured by Tanabe Plastic Machine K.K., and worked at an extruder temperature of 220 to 260° C., a die temperature of 260° C., a cooling temperature by chill roll of 30° C., a taking speed of 20 m/min, to produced a film having a thickness of 30 μm.

(2) Production of Film Coated Sheet

An amorphous propylene polymer (manufactured by Sumitomo Chemical Co., Ltd, grade name: Tafcerone X1102, crystal fusion peak was not observed by DSC) was fed as an adhesive polymer to VS30 single screw extruder (screw diameter: 30 mm, manufactured by Tanabe Plastic Machine K.K.), and a sheet was continuously extruded from a T type extrusion die (width: 350 mm) at an extrusion temperature of 250° C. Then, the above-mentioned sheet was continuously extruded and passed between a first roll and a second roll in a taking roll (type: horizontal 4-continuous type bank molding type, manufactured by Ninbari K.K.), further, the film produced in (1) was fed via the first roll and the second roll. By taking the sheet and film while being pressed between the first roll and the second roll, a film coated sheet composed of three layers of film/sheet/film was continuously produced. In this procedure, the set temperature was 25° C. and the roll peripheral speed was 0.15 m/minutes, in each roll. The resulted film coated film had a total thickness of 3.6 mm.

(3) Production of Non-Mutually-Adhesive Polymer Pellet

The film coated sheet obtained in (2) was held on a heating plate controlled at a temperature of 60° C., heated until the surface temperature of the coated sheet reached 60° C., then, the sheet was pressed at an initial pressure of 3.0 kg/cm$^2$ by a press holding cutting blades at parallel separate positions having one edge length of 10 mm, and a pressure of 4.5 kg/cm$^2$ was applied in cutting, to conduct deformation and cutting of the film coated sheet. Then, the sheet was pressed at an initial pressure of 3.0 kg/cm$^2$ in a direction vertical to the above-mentioned cutting direction by a press holding cutting blades at parallel separate positions having one edge length of 7 mm, and a pressure of 4.5 kg/cm$^2$ was applied in cutting, to conduct deformation and cutting of the film coated sheet. The resulting pellets had one edge lengths of about 10 mm and about 7 mm and a thickness of 3.6 mm. The adhesive polymer exposure index of the resulting pellets and the results of evaluation of mutual adhesion property are shown in Table 1.

Example 2

Pellets were produced in the same manner as in Example 1, except that the sheet was pressed at an initial pressure of 2.0 kg/cm$^2$ by a press holding cutting blades at parallel separate positions having one edge length of 10 mm, and a pressure of 4.5 kg/cm$^2$ was applied in cutting, to conduct deformation and cutting of the film coated sheet, and then the sheet was pressed at an initial pressure of 2.0 kg/cm$^2$ in a direction vertical to the above-mentioned cutting direction by a press holding cutting blades at parallel separate positions having one edge length of 7 mm, and a pressure of 4.5 kg/cm$^2$ was applied in cutting, to conduct deformation and cutting of the film coated sheet, in Example 1, (3). The adhesive polymer exposure index of the resulting pellets and the results of evaluation of mutual adhesion property are shown in Table 1.

Example 3

Pellets were produced in the same manner as in Example 1, except that the sheet was pressed at an initial pressure of 4.0 kg/cm$^2$ by a press holding cutting blades at parallel separate positions having one edge length of 10 mm, and a pressure of 4.5 kg/cm$^2$ was applied in cutting, to conduct deformation and cutting of the film coated sheet, and then the sheet was pressed at an initial pressure of 4.0 kg/cm$^2$ in a direction vertical to the above-mentioned cutting direction by a press holding cutting blades at parallel separate positions having one edge length of 7 mm, and a pressure of 4.5 kg/cm$^2$ was applied in cutting, to conduct deformation and cutting of the film coated sheet, in Example 1, (3). The adhesive polymer exposure index of the resulting pellets and the results of evaluation of mutual adhesion property are shown in Table 1.

Example 4

Pellets were produced in the same manner as in Example 1, except that the surface temperature of the coated sheet was controlled at 40° C. in Example 1. The adhesive polymer exposure index of the resulting pellets and the results of evaluation of mutual adhesion property are shown in Table 1.

Comparative Example 1

Pellets were produced in the same manner as in Example 1, except that the surface temperature of the coated sheet was controlled at 23° C. in Example 1, (3). In this case, the crystalline olefin polymer film at the lower side of the coated sheet could not be cut successfully, and pellets could not be obtained.

Comparative Example 2

Pellets were produced in the same manner as in Example 1, except that the surface temperature of the coated sheet was controlled at 23° C., the sheet was pressed at an initial pressure of 4.0 kg/cm$^2$ by a press holding cutting blades at parallel separate positions having one edge length of 10 mm, and a pressure of 4.5 kg/cm$^2$ was applied in cutting, to conduct deformation and cutting of the film coated sheet, and then the sheet was pressed at an initial pressure of 4.0 kg/cm$^2$ in a direction vertical to the above-mentioned cutting direction by a press holding cutting blades at parallel separate positions having one edge length of 7 mm, and a pressure of 4.5 kg/cm$^2$ was applied in cutting, to conduct deformation and cutting of the film coated sheet, in Example 1. The adhesive polymer exposure index of the resulting pellet sand the results of evaluation of mutual adhesion property are shown in Table 1. The results of evaluation of mutual adhesion property of the resulting pellets are shown in Table 1. In this case, pellets could be obtained; however, the mutual adhesion property deteriorated due to large adhesive polymer exposure index.

TABLE 1

|  | Adhesive polymer exposure index (%) | Results of evaluation of mutual adhesion property of pellets |
|---|---|---|
| Example 1 | 20 | A |
| Example 2 | 26 | A |
| Example 3 | 33 | A |
| Example 4 | 50 | B |
| Comparative example 1 | Pellets could not be obtained | |
| Comparative example 2 | 100 | C |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a polymer pellet comprising a step of deforming, at temperatures of about 30 to 150° C. and under pressure, a composite comprising an amorphous propylene-ethylene-1-butene copolymer coated with a crystalline olefin polymer, and a step of cutting a deformed portion of the composite, wherein the step of deforming and the step of cutting are performed with a same blade such that a pressure applied to the composite by the blade during deforming is lower than a pressure applied to the composite by the blade during cutting.

2. The method of producing a polymer pellet according to claim 1, wherein the composite is deformed to a thickness of about 10 to 30% of a thickness before deformation.

3. The method of producing a polymer pellet according to claim 1, wherein a proportion of exposure of the amorphous propylene-ethylene-1-butene copolymer at a surface formed by the cutting is 50% or less.

4. The method of producing a polymer pellet according to claim 1, wherein the composite is sheet-shaped and is obtained by coating an upper surface and a lower surface of a sheet of the amorphous propylene-ethylene-1-butene copolymer with respective sheets of the crystalline olefin polymer.

5. The method of producing a polymer pellet according to claim 1, wherein the composite has a core-sheath structure comprising the amorphous propylene-ethylene-1-butene copolymer as a core and the crystalline olefin polymer as a sheath.

6. The method of producing a polymer pellet according to claim 1, wherein the step of cutting is performed at a temperature of 30 to 150° C.

7. The method of producing a polymer pellet according to claim 1, wherein the step of deforming results in a deformation along a specific pattern in the composite and the step of cutting results in a cutting along the specific pattern.

8. The method of producing a polymer pellet according to claim 1, wherein the step of deforming and the step of cutting are performed so as to obtain a proportion of exposure of the amorphous propylene-ethylene-1-butene copolymer at a surface formed by the cutting, wherein the proportion is about 30% or less.

9. The method of producing a polymer pellet according to claim 1, wherein the step of deforming and the step of cutting are performed by a same blade and a pressure of the blade is set during the deforming so as to obtain a proportion of exposure of the amorphous propylene-ethylene-1-butene copolymer at a surface formed by the cutting, wherein the proportion is about 20% or less.

10. The method of producing a polymer pellet according to claim 1, wherein the composite is deformed to a thickness of about 10 to 30% of a thickness before deformation.

* * * * *